US006411574B1

(12) United States Patent
Su et al.

(10) Patent No.: US 6,411,574 B1
(45) Date of Patent: Jun. 25, 2002

(54) CODING METHOD FOR HIGH-CAPACITY STORAGE MEDIUM AND THE DECODING MEANS FOR THE SAME

(75) Inventors: Chien-Fang Su, Tai Nan; Chwei-Jing Yeh, Taipei Hsien, both of (TW)

(73) Assignee: Ritek Corporation (TW)

( * ) Notice: Subject to any disclaimer, the term of this patent is extended or adjusted under 35 U.S.C. 154(b) by 0 days.

(21) Appl. No.: 09/395,351

(22) Filed: Sep. 14, 1999

(51) Int. Cl.$^7$ ................................................. G11B 7/00
(52) U.S. Cl. ............................... 369/47.11; 369/275.3; 369/47.27; 369/47.39
(58) Field of Search .................... 369/47.21, 47.22, 369/47.27, 59.23, 59.25, 47.11, 47.39, 275.3

(56) References Cited

U.S. PATENT DOCUMENTS

| | | | | |
|---|---|---|---|---|
| 5,305,296 A | * | 4/1994 | Kono | 369/58 |
| 5,351,226 A | * | 9/1994 | Mizumoto et al. | 369/47 |
| 5,559,778 A | * | 9/1996 | Inokuchi et al. | 369/58 |
| 5,721,856 A | * | 2/1998 | Takeuchi | 369/58 |
| 5,737,289 A | * | 4/1998 | Udagawa | 369/54 |
| 5,745,459 A | * | 4/1998 | Inokuchi et al. | 369/47 |
| 5,926,453 A | * | 7/1999 | Muramatsu et al. | 369/275.4 |
| 6,115,353 A | * | 9/2000 | Horie et al. | 369/275.4 |

* cited by examiner

*Primary Examiner*—Nabil Hindl
(74) *Attorney, Agent, or Firm*—Rosenberg, Klein & Lee

(57) ABSTRACT

A coding method for high-capacity storage medium is provided. The the physical location of the code is arranged in an annulus area at inner side of the inner most edge of the compact disk and/or the lead-in area such that the storage medium is accessible in the existing CD-R/CD-RW. The recording time of the existing CD-R/CD-RW can be expended from 80 to 100 minutes.

2 Claims, 12 Drawing Sheets

| | | | |
|---|---|---|---|
| T1 | = | Start time HCC | = T5-01:43:00(or eariler) |
| T2 | = | Stop time HCC | = T5-01:03:00(before T3) |
| T3 | = | Start time PCA | = T5-00:35:65 |
| T4 | = | Start time PMA | = T5-00:13:25 |
| T5 | = | Start time Lead-in Area | = encoded in ATIP |
| T6 | = | End time Lead-in Area<br>Start Time Program Area | = 99:59:74<br>= 00:00:00 |
| T7 | = | Last possible start time of Lead-out Area | = The capacity is the Last possible start time of Lead-out of Special information 3 + extended time | t1 = Start time PCA = t3 − 00:35:65
t2 = Start time PMA = t3 − 00:13:25
t3 = Start time Lead-in Area = encoded in ATIP
t4 = End time Lead-in Area = 99:59:74
   Start Time Program Area = 00:00:00
t5 = Last possible start time = encoded in ATIP
   of Lead-out Area

| Bit 5 | | | | | | | | Bit 13 | | | | | | | | Bit 21 | | | | | | | |
|---|---|---|---|---|---|---|---|---|---|---|---|---|---|---|---|---|---|---|---|---|---|---|---|
| M1 | X | X | X | X | X | X | X | S1 | X | X | X | X | X | X | X | F1 | X | X | X | X | X | X | X |

FIG.2
PRIOR ART

| Frame number | Frame contents |
|---|---|
| N | Special Information 1 |
| N+1 . . N+9 | Normal timecode |
| N+10 | Special Information 2 |
| N+11 . . N+19 | Normal timecode |
| N+20 | Special Information 3 |
| N+21 . . N+29 | Normal timecode |
| N+30 | Special Information 1 |
| N+31 . . N+39 | Normal timecode |
| N+40 | Special Information 2 |
| N+41 . . | Normal timecode |

FIG.3
PRIOR ART

| M1 | | | | | | | S1 | | | | | | | | F1 | | | | | | |
|---|---|---|---|---|---|---|---|---|---|---|---|---|---|---|---|---|---|---|---|---|---|
| 1 | W1 | W2 | W3 | X1 | V1 | V2 | V3 | 0 | U1 | U2 | U3 | U4 | U5 | U6 | U7 | 1 | D1 | B1 | B2 | B3 | A1 | A2 | A3 |

FIG.4
PRIOR ART

| M1 | | | | | | | | S1 | | | | | | | | F1 | | | | | | | |
|---|---|---|---|---|---|---|---|---|---|---|---|---|---|---|---|---|---|---|---|---|---|---|---|
| 1 | M2 | M3 | M4 | M5 | M6 | M7 | M8 | 1 | S2 | S3 | S4 | S5 | S6 | S7 | S8 | 0 | F2 | F3 | F4 | F5 | F6 | F7 | F8 |

FIG.5
PRIOR ART

| M1 | | | | | | | | S1 | | | | | | | | F1 | | | | | | | |
|---|---|---|---|---|---|---|---|---|---|---|---|---|---|---|---|---|---|---|---|---|---|---|---|
| 1 | M2 | M3 | M4 | M5 | M6 | M7 | M8 | 1 | S2 | S3 | S4 | S5 | S6 | S7 | S8 | 1 | F2 | F3 | F4 | F5 | F6 | F7 | F8 |

FIG.6
PRIOR ART

| M1-M8 | Extended time |
|---|---|
| 00000000 | Invalid |
| 00000001 | 1min |
| 00000010 | 2min |
| ⋮ | ⋮ |
| 00100000 | 20min |
| 00100001~ 01111001 | Reserved |

FIG.7

| T1 | = | Start time HCC | = T5−01:43:00(or eariler) |
| T2 | = | Stop time HCC | = T5−01:03:00(before T3) |
| T3 | = | Start time PCA | = T5−00:35:65 |
| T4 | = | Start time PMA | = T5−00:13:25 |
| T5 | = | Start time Lead−in Area | = encoded in ATIP |
| T6 | = | End time Lead−in Area<br>Start Time Program Area | = 99:59:74<br>= 00:00:00 |
| T7 | = | Last possible start time<br>of Lead−out Area | = The capacity is the Last possible<br>start time of Lead−out of Special<br>information 3 + extended time |

| HCC Frame number | HCC Frame contents |
|---|---|
| N | HCC special information 1 |
| N+1 . . N+9 | Normal timecode |
| N+10 | HCC special information 2 |
| N+11 . . N+19 | Normal timecode |
| N+20 | HCC special information 3 |
| N+21 . . N+29 | Normal timecode |
| N+30 | HCC Additional information 3 |
| N+31 . . N+39 | Normal timecode |
| N+40 | HCC special information 1 |
| N+41 . . N+49 | Normal timecode |
| N+50 | HCC special information 2 |
| N+51 . . Repeating many times | Normal timecode |

FIG.9

| M1 | | | | | | | | S1 | | | | | | | | F1 | | | | | | | |
|---|---|---|---|---|---|---|---|---|---|---|---|---|---|---|---|---|---|---|---|---|---|---|---|
| 0 | M2 | M3 | M4 | M5 | M6 | M7 | M8 | 1 | – | – | – | – | – | – | – | 1 | – | – | – | – | – | – | – |

| M1–M8 | Extended time |
|---|---|
| 00000000 | Invalid |
| 00000001 | 1min |
| 00000010 | 2min |
| : | : |
| 00100000 | 20min |
| 00100001~ 01111001 | Reserved |

FIG.10

| M1 | | | | | | | | S1 | | | | | | | | F1 | | | | | | | |
|---|---|---|---|---|---|---|---|---|---|---|---|---|---|---|---|---|---|---|---|---|---|---|---|
| 1 | – | – | – | – | – | – | – | 0 | – | – | – | – | – | – | – | 1 | – | – | – | – | A1 | A2 | A3 |

A1A2A3 : Index of appended data

FIG.11

| Frame number | Frame contents |
|---|---|
| N | Special Information 1 |
| N+1 . . . N+9 | Normal timecode |
| N+10 | Special Information 2 |
| N+11 . . N+19 | Normal timecode |
| N+20 | Special Information 3 |
| N+21 . . N+29 | Normal timecode |
| N+30 | Addtional information 3 |
| N+31 . . N+39 | Normal timecode |
| N+40 | Special Information 1 |
| N+41 . . N+49 | Normal timecode |
| N+50 | Special Information 2 |
| N+51 . . Repeating many times | Normal timecode |

FIG.12

| M1 | | | | | | | | S1 | | | | | | | | F1 | | | | | A1 | A2 | A3 |
|---|---|---|---|---|---|---|---|---|---|---|---|---|---|---|---|---|---|---|---|---|---|---|---|
| 1 | – | – | – | – | – | – | – | 0 | – | – | – | – | – | – | – | 1 | – | – | – | – | | | |

FIG.13

| HCC Frame number | HCC Frame contents |
|---|---|
| N | HCC special information 1 |
| N+1 <br> . <br> . <br> N+9 | Normal timecode |
| N+10 | HCC special information 2 |
| N+11 <br> . <br> . <br> N+19 | Normal timecode |
| N+20 | HCC special information 3 |
| N+21 <br> . <br> . <br> N+29 | Normal timecode |
| N+30 | HCC additional information 1 |
| N+31 <br> . <br> . <br> N+39 | Normal timecode |
| N+40 | HCC additional information 2 |
| N+41 <br> . <br> . <br> N+49 | Normal timecode |
| N+50 | HCC additional information 3 |
| N+51 <br> . <br> . <br> N+59 | Normal timecode |
| N+60 | HCC special information 1 |
| N+61 <br> . <br> . <br> Repeating many times | Normal timecode |

FIG.14

| Frame number | Frame contents |
|---|---|
| N | Special Information 1 |
| N+1 . . N+9 | Normal timecode |
| N+10 | Special Information 2 |
| N+11 . . N+19 | Normal timecode |
| N+20 | Special Information 3 |
| N+21 . . N+29 | Normal timecode |
| N+30 | Additional information 1 |
| N+31 . . N+39 | Normal timecode |
| N+40 | Additional information 2 |
| N+41 . . N+49 | Normal timecode |
| N+50 | Additional information 3 |
| N+51 . . N+59 | Normal timiecode |
| N+60 | Special Information 1 |
| N+61 . . Repeating many times | Normal timecode |

FIG.15

CODING METHOD FOR HIGH-CAPACITY STORAGE MEDIUM AND THE DECODING MEANS FOR THE SAME

FIELD OF THE INVENTION

The present invention relates to a coding method for high-capacity storage medium and the decoding means for the same, more particular, to a coding method for CD-Recordable (CD-R), CD-Rewritable (CD-RW) to enhance the storage capacity thereof while being compatible with existing system and the decoding means for the same.

BACKGROUND OF THE INVENTION

As the rapid development of computer software and raising of CPU speed, the storage of conventional storage means is not enough. Although advanced storage mediums such as DVD is developed to overcome this problem, those medium are not mature to satisfy user's need. Therefore, it is an important issue to enhance the storage capacity of the existing CD-R,CD-RW.

FIGS. 1–6 show the conventional coding method for CD, wherein FIG. 1 shows the ATIP (absolute time in pre-groove) coding for the conventional CD-R/CD-RW. The guiding groove is a trench with sinusoid-like wobble in a specific frequency and the information such as timing data and the disk format are established with respect to the frequency as a carrier frequency. As shown in FIG. 1, the ATIP coding begins from the program area and extends outward. The program area begins at t4 (00:00:00), which also records the end time in lead-in area (99:59:74). The time t5 indicates the begin time of the lead-out area of the last data and is determined by ATIP coding. As to the inward direction, the time t3 indicates the begin time of the lead-in area and is determined by ATIP coding. More inward is the time t2 for begin time of PMA (t3-00:13:25) and the time t1 for the begin time of PCA(t3-00:35:65). In other word, the data structure of CD are, from inner side, PCA, PMA, lead-in area, program area and lead-out area. The recording time is counted from time t4 and extends outward and inward from the lead-in time defined by ATIP.

FIG. 2 shows the ATIP data format in the lead-in area for conventional CD-R/CD-RW. The BCD expression for the minute, second and frame in ATIP data format are as follows:

minute: 2 binary BCD (M1 . . . M4 and M5 . . . M8), the MSBit (M1) in 5th location;

second: 2 binary BCD (S1 . . . S4 and S5 . . . S8), the MSBit (S1) in 13th location;

frame: 2 binary BCD (F1 . . . F4 and F5 . . . F8), the MSBit (F1) in 21st location;

and when M1S1F1

=000, the time code of the program area and the lead-out area;

=100, time code of PCA (power correction area), PMA (program manage area) and the lead-in area;

=101, special information 1 for writing power, reference rotation speed, application code and disk format;

=110, special information 2 for begin time of lead-in area;

=111, special information 3 for the possible begin time of the last last-out area;

=001, additional information 1 undefined in CD-R and for speed range, optimal control parameter and erasing power in high/low recording speed in CD-RW;

=010, additional information 2 undefined in CD-R and for writing power in high/low recording speed, optimal control parameter and erasing power in high/low recording speed in CD-RW;

=011, additional information 3, undefined in CD-R and CD-RW.

FIG. 3 shows the ATIP coding in the lead-in area of the conventional CD-R. One ATIP coding frame encoded with special information, followed by nine ATIP frame encoded with timecode information, such as follows, a special information 1 (3 bytes) followed by 9 normal time code, a special information 2, 9 normal time code, a special information 3, and 9 normal time code. In order, the three special information with 27 time code cyclically appear in the lead-in area.

FIG. 4 shows partial data in special information 1 of the ATIP coding in the conventional CD-R. The area is defined by M1S1F1=101, and the usage of the additional information is defined by the frame coding area A1, A2 and A3. In existing CD-R, the additional information are undefined, and in CD-RW, the additional information 1 and 2 are defined and the additional information 3 is undefined.

FIG. 5 shows the data format in special information 2 of the ATIP coding in the conventional CD-R. The area is defined by M1S1F1=110 and defines the begin time of the lead-in area.

FIG. 6 shows the data format in special information 3 of the ATIP coding in the conventional CD-R. The area is defined by M1S1F1=111 and defines the possible begin time of the out most lead-out area. When CD-R/CD-RW reads the ATIP data of CD, the M1S1F1 of the special information 3 is interpreted as 000. Therefore, in the scheme of BCD coding, the maximum recordable minute is 111 1001 (79 minutes), the maximum recordable second is 110 1001 (59 seconds), and the maximum recordable frame is 111 0100 (74 frames) with 7 bits. In other word, the data length for existing CD-R/CD-RW is only 79 minutes and 59 seconds and 74 frames.

From above description, due to the limitation of BCD code, the storage capacity of the conventional CD is limited to about 80 minutes.

In general, the possible ways for increasing storage capacity are: (1) more efficient data coding, (2) reduce pit length and track pitch, (3) shorter wavelength, (4) larger numeral aperture, (5) multi-layer structure.

It is the object of the present invention to provide a coding method for high-capacity storage medium to increase the storage length to 100 minutes and the decoding means for the same.

The various objects and advantages of the present invention will be more readily understood from the following detailed description when read in conjunction with the appended drawing, in which:

BRIEF DESCRIPTION OF DRAWING

FIG. 2 shows the ATIP data format in the lead-in area for conventional CD-R/CD-RW.

FIG. 3 shows the ATIP coding in the lead-in area of the conventional CD-R.

FIG. 4 shows partial data in special information 1 of the ATIP coding in the conventional CD-R.

FIG. 5 shows the data format in special information 2 of the ATIP coding in the conventional CD-R.

FIG. 6 shows the data format in special information 3 of the ATIP coding in the conventional CD-R FIG. 7 shows the coding of extended data according to a preferred embodiment of the present invention.

FIG. 9 shows the HCC data structure according to a preferred embodiment of the present invention.

FIG. 10 shows the data structure in the additional information 3 of the present invention.

FIG. 11 shows the data structure of the special information 1 of the present invention in (HCC area and lead-in area).

FIG. 12 shows the data structure in the lead-in area of CD according to another embodiment of the present invention.

FIG. 13 shows the data structure of the special information 1 in the HCC area and lead-in area of the CD-RW according to the present invention.

FIG. 14 shows the data structure of the HCC area and lead-in area of the CD-RW according to the present invention.

FIG. 15 shows the data structure of lead-in area of the CD-RW according to the present invention.

DETAIL DESCRIPTION OF PREFERRED EMBODIMENT

FIG. 7 shows the coding of extended data according to a preferred embodiment of the present invention. As shown in this figure, a byte of data is used to encode the extended data such that the extended data added with the original data provide storage capacity of 100 minute.

For example:

ATIP special information 3=11111001 110111001 11110100
=70:59:74 (minute:second:frame)

extended data=00100000 100000000 10000000
the total storage time is 99:59:74 (the last possible begin time of the lead-out area)

Figure 1:
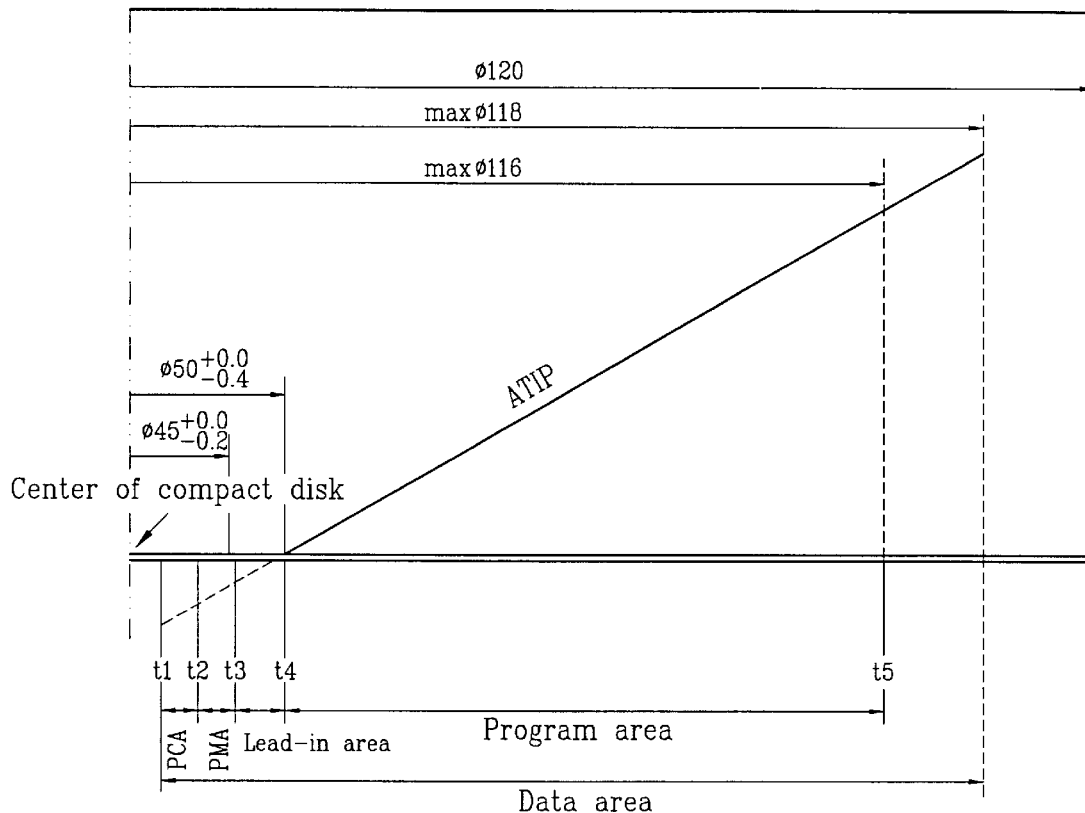
FIG. 1 shows the ATIP (absolute time in pre-groove) coding for the conventional CD-R/CD-RW.
Figure 8:
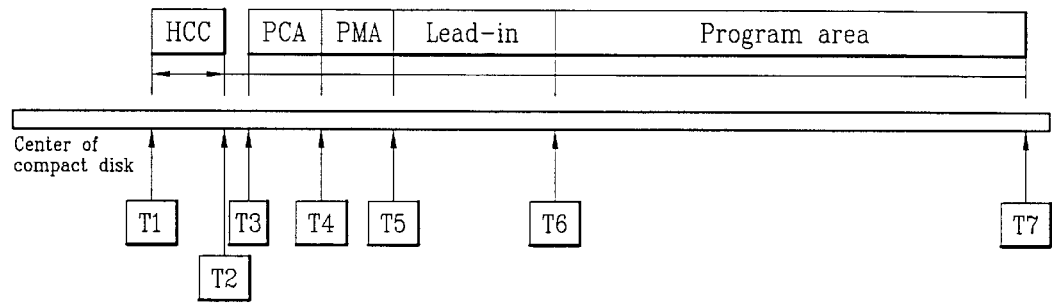
FIG. 8 shows the HCC (high capacity code) according to a preferred embodiment of the present invention.

FIG. 8 shows the HCC (high capacity code) according to a preferred embodiment of the present invention. The radius where the program begins is unchanged. Here, the time t6 is the end time of the lead-in area and the program begin time, t5 is the begin time of the lead-in area defined by ATIP coding, t4 is the begin time of the PMA, t3 is the begin time of the PCA, t1 is the begin time of the HCC area, t2 is the end time of the HCC area. The time t2 should be earlier than the time t3 such that a physical separation is formed between the HCC area and the PCA area. By this physical separation, the data established in the HCC will not interfere with the data of existing CD-R,CD-RW. The time t7 records the real time of the last possible lead-out area. The total recording time is the sum of the last possible lead-out time in the special information 3 of the lead-in area added with the extended time in the additional information 3 in the HCC area.

FIG. 9 shows the HCC data structure according to a preferred embodiment of the present invention, wherein the additional information 1 and 2 are not defined, the additional information 3 is defined while the data structure in the lead-in area is not changed. To access the extra data in the HCC area, the CD-R driver should move PUH (pick-up head) to the inner disk for reading the HCC's data.

FIG. 10 shows the data structure in the additional information 3 of the present invention. The 8 bits M1–M8 for minute of the CD defines the possible extended time of the CD-R,CD-RW. When all the 8 bits are zero, the additional information is not used. For example, the last possible lead-out time in the special information 3 of the lead-in area is 79:59:74 and the extended time in the additional information 3 in the HCC area is 20 minutes (00100000), the total recording time for the CD-R,CD-RW is 100 minutes.

FIG. 11 shows the data structure of the special information 1 of the present invention in (HCC area and lead-in area). The frame area A1A2A3 in the special information 1 of the HCC area and lead-in area should be modified for the accessing of the CD-R,CD-RW when the extended recording time is to be defined in the HCC area. When A1A2A3=000, there is no additional information,; when A1A2A3=001, there is only additional information 3 in HCC area and the other content in A1A2A3 are not defined. The special information 2 and 3 in the HCC area define the begin and end time of the HCC area and the data structures are the same as the special information 2 and 3 in the lead-in area as shown in FIGS. 5 and 6.

The another preferred embodiment of the present invention is described below. With reference again to FIG. 11, the frame area A1A2A3 in the special information 1 of lead-in area should be modified for the accessing of the CD-R,CD-RW when the extended recording time is to be defined in the lead-in area and not in the HCC area. When A1A2A3=000, there is no additional information,; when A1A2A3=001, there is only additional information in lead-in area and the other content in A1A2A3 are not defined.

FIG. 12 shows the data structure in the lead-in area of CD-R,CD-RW according to another embodiment of the present invention. The additional information 3 is incorporated in the data structure beside the original special information 1, 2 and 3. The data structure of the additional information 3 is shown in FIG. 10. The different combination of the 8 bits M1–M8 for minute of the CD-R,CD-RW defines the possible extended time of the CD-R,CD-RW. When all the 8 bits are zero, the additional information is not used. For example, the last possible start time of lead-out area in the special information 3 is 79 minutes and 59 seconds and 74 frames., and the extended time in the additional information 3 is 20 minutes, the total recording time for the CD-R,CD-RW is 99:59:74.

The above two embodiments can be combined to apply in CD-R.

The present invention can also be applied to CD-RW. With reference to FIGS. 8 and 10, the additional information 1 and 2 of the CD-RW are defined, the information of the special information 1 and associated with the additional information is modified.

Figure 13:
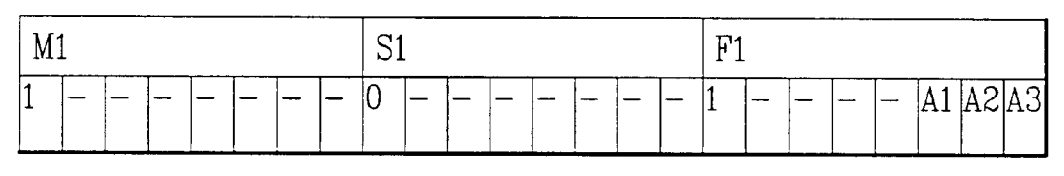

FIG. 13 shows the data structure of the special information 1 in the HCC area and lead-in area of the CD-RW according to the present invention. The frame area A1A2A3 in the special information 1 of the HCC area and lead-in area should be modified for the accessing of the CD-RW when the extended recording time is to be defined in the HCC area. When A1A2A3=000, this frame area is not used; when A1A2A3=100, the additional information 1 and 2 are in HCC area; when A1A2A3=111, the additional information 1, 2 and 3 are defined and the other content in A1A2A3 are not defined. The special information 2 and 3 in the HCC area define the begin and end time of the HCC area and the data structures are the same as the special information 2 and 3 in the lead-in area as shown in FIGS. 5 and 6.

FIG. 14 shows the data structure of the HCC area and lead-in area of the CD-RW according to the present invention. The data structure in the HCC area is cyclical data including special information 1, 2 and 3 and the additional information 1, 2 and 3, and the lead-in area is not changed.

The another embodiment for CD-RW according to the present invention is described below.

With reference again to FIG. 13, the frame area A1A2A3 in the special information 1 of the HCC area and lead-in area should be modified for the accessing of the CD-RW when the extended recording time is to be defined in the HCC area. When A1A2A3=100, this frame area is not used; when A1A2A3=110, the additional information 1 and 2 are in lead-in area (original format); when A1A2A3=111, the additional information 1, 2 and 3 are defined and the other content in A1A2A3 are not defined.

FIG. 15 shows the data structure of lead-in area of the CD-RW according to the present invention. Beside the special information 1, 2 and 3 and the additional information 1 and 2, the additional information 3 should be defined, as shown in FIG. 10.

Figure 16:
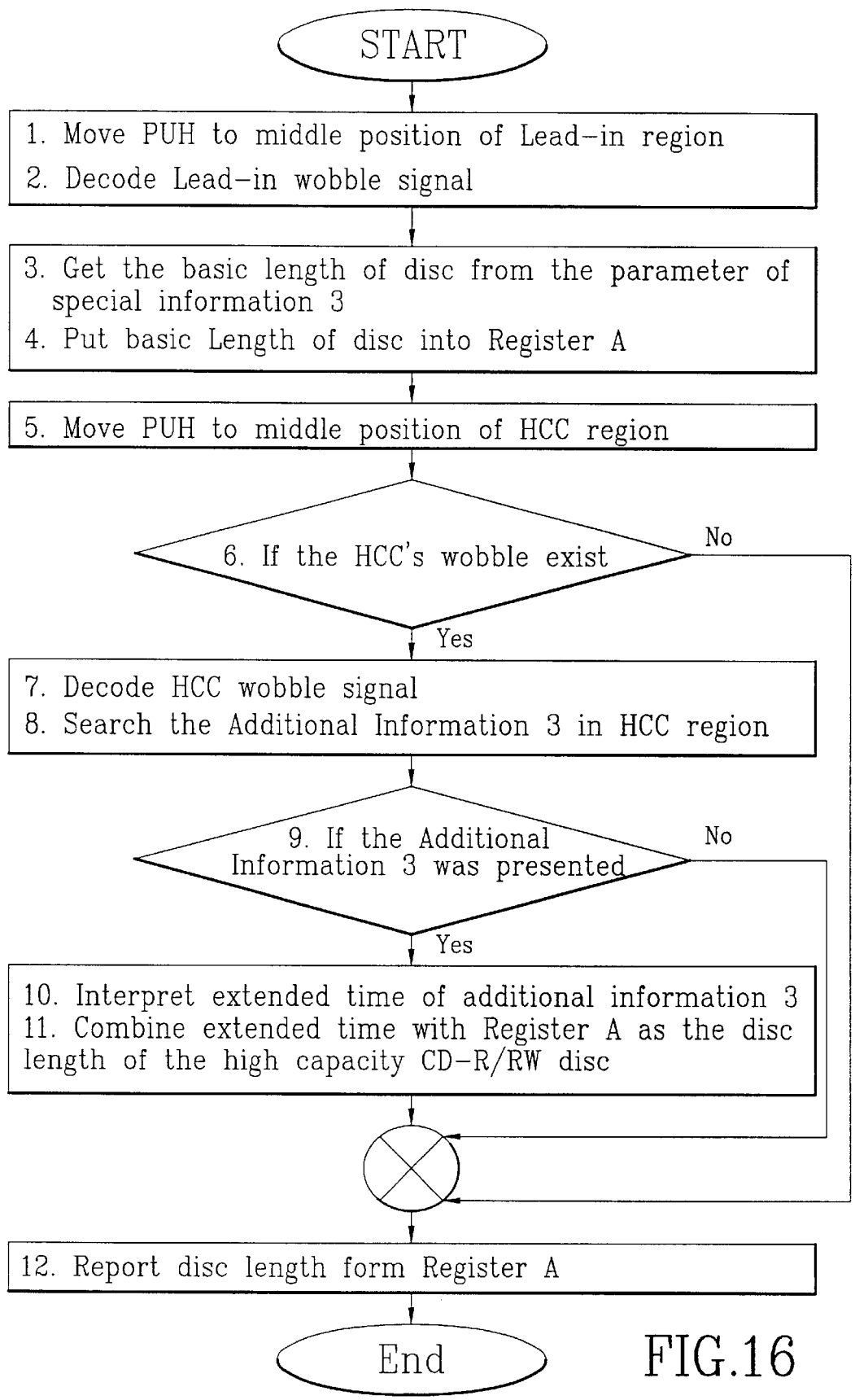
FIG. 16 shows the algorithm of the decoding means of the CD-RW according to the present invention.

FIG. 16 shows the algorithm of the decoding means of the CD-RW according to the present invention. Provided that the additional information 3 is defined in the HCC area, the CD-R driver should move PUH (pick-up head) to the inner disk for reading the HCC's data. When the disk is inserted into the CD-RW, the driver moves PUH to the center position of the lead-in area, reads the ATIP codes in the lead-in area, calculates the basic recording length in the special information 3 of the lead-in area, and stores the data in register A. Afterward, the PUH moves inward to the center position of the HCC area and reads the data therein, and reads the expended recording time in the additional information 3. The expended recording time is then added with the last lead-out time in the lead-in area to obtain the total recording time for the CD-RW. Afterward, the PUH accesses data with a lower recording speed on a CD-RW with smaller track pitch. In this way, the recording time of the existing CD-R/CD-RW can be expended from 80 to 100 minutes. Moreover, another algorithm is required when the additional information is placed in location other than the HCC area.

The present invention has following advantages:
1. The recording time of the existing CD-R/CD-RW can be expended from 80 to 100 minutes.
2. The mastering task can be realized with existing facility.
3. The disk encoded with the inventive method is compatible with the existing CD-R/CD-RW.
4. According to the present invention, the conventional CD-R/CD-RW recorder can used to record high-capacity (100 minutes) disk after being modified the firmware and algorithm thereof.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A coding method for increasing usable storage capacity of an optical disk having a power correction area spaced from a center of rotation of the optical disk and an absolute time in pre-grove coding in a program area, comprising a high capacity code area disposed in an inner region of the disk defined between the center of rotation and the power correction area, said high capacity code area being encoded with a binary coded decimal code representing an extended time code ranging from 0 to 20 minutes that when added to a maximum time code of the absolute time in pre-grove coding establishes a last possible start time of a lead out area of the program area and thereby defines a maximum program area storage time approximating 100 minutes.

2. The coding method for increasing usable storage capacity of an optical disk as recited in claim 1, wherein said high capacity code area is spaced from the power correction area.

* * * * *